(12) United States Patent
Sze

(10) Patent No.: US 11,493,141 B1
(45) Date of Patent: Nov. 8, 2022

(54) VALVE TORQUE CONTROL SYSTEM AND CONTROL METHOD THEREOF

(71) Applicant: Chun Kuen Sze, Hong Kong (HK)

(72) Inventor: Chun Kuen Sze, Hong Kong (HK)

( * ) Notice: Subject to any disclaimer, the term of this patent is extended or adjusted under 35 U.S.C. 154(b) by 0 days.

(21) Appl. No.: 17/694,673

(22) Filed: Mar. 15, 2022

Related U.S. Application Data

(63) Continuation of application No. PCT/CN2021/124109, filed on Oct. 15, 2021.

(51) Int. Cl.
  *F16K 31/04* (2006.01)
  *G05D 17/02* (2006.01)
  *F16K 37/00* (2006.01)

(52) U.S. Cl.
  CPC ........... *F16K 31/046* (2013.01); *G05D 17/02* (2013.01); *F16K 37/0041* (2013.01); *F16K 37/0058* (2013.01)

(58) Field of Classification Search
  CPC ............................. F16K 31/046; G05D 17/02
  See application file for complete search history.

(56) References Cited

U.S. PATENT DOCUMENTS

| 5,228,645 A * | 7/1993 | Reinicke ................. F16K 5/201 |
| | | 251/129.13 |
| 6,543,416 B2 * | 4/2003 | Kowatari ................ F02D 11/10 |
| | | 123/399 |

* cited by examiner

*Primary Examiner* — Eric Keasel

(57) ABSTRACT

A torque control system is configured to automatically determine the fully open position and fully closed position of the valve without the need of manual operation of the valve. In addition, a control unit of the torque control system can obtain a control parameter based on a driving device operation signal detected by a detection unit, and output a control command to a driving unit to change an operation parameter of the driving device, so that the torque applying by the driving device on the valve can be adjusted, therefore the torque control system of the present application can accurately output the operating torque required by the valve, so that there is no circumstances that the operating torque is too large to damage the valve or the operating torque is too small to be unable to drive the valve.

18 Claims, 4 Drawing Sheets

VALVE TORQUE CONTROL SYSTEM AND CONTROL METHOD THEREOF

CROSS REFERENCE TO RELATED APPLICATIONS

The present application is a Continuation Application of PCT Application No. PCT/CN2021/124109 filed on Oct. 15, 2021, the contents of which are incorporated herein by reference in their entirety.

TECHNICAL FIELD

The present disclosure relates to a valve torque control system and a control method thereof.

BACKGROUND TECHNOLOGY

This section provides background information relating to the present disclosure. However, this information does not necessarily constitute the prior art.

A valve is a mechanical product that is subjected to internal pressure. Hence, it must have sufficient strength and rigidity to ensure long-term use without occurrence of rupture or causing of deformation. Starting and closing force and opening and closing torque refer to the acting force or torque that must be exerted for opening or closing the valve. The valve opening and closing torque is an important performance index that reflects the comprehensive level of the valve. Most of the traditional valve operating devices directly output a fixed torque to open or close the valve based on software algorithms according to the relevant national standards.

SUMMARY OF THE INVENTION

This section provides a general summary of the present disclosure, rather than a comprehensive disclosure of the full scope or all features of the present disclosure.

The inventors of the present application have noticed that in the currently known devices for controlling the torque on a valve, a fixed torque is usually output directly according to a software algorithm, although it can satisfy the basic valve opening and closing function to a certain extent, however since the connection relationship between a valve and a handle changes randomly according to actual situations, the traditional valve control module cannot determine the open position and the fully closed position of the valve, it is troublesome during installation; and different opening and closing torques are required by different types of valves, it is impossible to know the opening and closing torque value of the valve under the actual operating condition, the operating torque applying by a driving device on the valve often has the problem of excessive torque selection that damages the valve or insufficient torque selection that is unable to drive the valve.

Therefore, there is a need to improve the existing torque control modules, in order to overcome or alleviate all or at least some of the above-mentioned technical problems.

An exemplary embodiment of the present disclosure provides a torque control system, the torque control system being used for controlling a torque applying on a valve during an opening and closing process of the valve, the torque control system including:

a drive unit, the drive unit including a driving device, the driving device operatively connected to the valve to drive the valve between a fully open position and a fully closed position of the valve;

a detection unit, the detection unit being used for detecting information related to operation of the driving device and generating a corresponding driving device operation signal; and a control unit, the control unit being configured to: receive the driving device operation signal from the detection unit; obtain a control parameter for controlling an operating torque of the driving device based on the driving device operation signal; generate a control command based on the obtained control parameter; and output the control command to the drive unit so as to change an operation parameter of the driving device, thereby adjusting the torque applying by the driving device to the valve.

In some optional embodiments, the torque control system is configured to: cause the driving device to drive the valve with a predetermined minimum operating torque, based on an initial control command output by the control unit; cause the detection unit to generate the driving device operation signal in response to the operation of the driving device, the driving device operation signal including a pulse signal;

cause the control unit to obtain a pulse signal number and a pulse signal time interval based on the pulse signal, and compare the obtained pulse signal number and the obtained pulse signal time interval respectively with a predetermined pulse signal number and a predetermined pulse signal time interval pre-stored in the control unit, so as to determine whether the torque applying by the driving device on the valve is insufficient; and in case it is determined that the torque applying by the driving device on the valve is insufficient, cause the control unit to output a torque increase command to the drive unit in order to increase the torque applying by the driving device on the valve.

In some optional embodiment, the torque control system is configured to: determine that the torque applying by the driving device on the valve is insufficient, in case the obtained pulse signal time interval is greater than the predetermined pulse signal time interval and the obtained pulse signal number is smaller than the predetermined pulse signal number.

In some optional embodiments, the torque control system is configured such that: in case it is determined that the torque applying by the driving device on the valve is insufficient, the control unit outputs the torque increase command to the drive unit and changes the operation parameter of the driving device in a pulse width modulation manner, thereby causing the torque applying by the driving device on the valve to gradually increase until a predetermined maximum operating torque of the driving device is reached.

In some optional embodiments, the torque increase command output by the control unit to the driving unit changes the operation parameter of the driving device in a pulse width modulation manner, so that the torque applying by the driving device on the valve is increased in an increment of 10% each time.

In some optional embodiments, the control unit may be configured to change the operation parameter of the driving device in a voltage feedback regulation manner or a current feedback regulation manner, thereby adjusting the torque applying by the driving device on the valve.

In some optional embodiments, the detection unit includes a pulse detector, the pulse detector is mounted in association with the drive unit and generates the pulse signal in response to the operation of the driving device, the detection unit further includes a current sensor, the current sensor is installed on the driving device and configured to detect an operating current of the driving device and generate a current signal during the opening and closing process of the valve, wherein the torque control system is configured to: cause the control unit to obtain a stall current of the driving device based on the current signal from the current sensor, and compare the obtained stall current with a predetermined stall current pre-stored in the control unit, in order to determine whether the valve is in the fully open position or the fully closed position, and in case it is determined that the valve is in the fully open position or the fully closed position, output a torque output stop command to the drive unit in order to cause the driving device to stop applying torque on the valve.

In some optional embodiments, the pulse detector may include a Hall sensor or a photoelectric coupler device.

In some optional embodiments, the torque control system is configured to: determine that the valve is in the fully open position or the fully closed position, cause the control unit to output the torque output stop command to the drive unit, such that the driving device stops applying torque to the valve, in case the obtained pulse signal time interval is greater than the predetermined pulse signal time interval, the obtained pulse signal number is greater than the predetermined pulse signal number, and the obtained stall current is greater than the predetermined stall current.

In some optional embodiments, the torque control system further includes an alarm unit, the torque control system being configured to: in case that the torque applying by the driving device on the valve exceeds the predetermined maximum operating torque of the driving device, cause the control unit to output the torque output stop command to the drive unit in order to cause the driving device to stop applying torque to the valve, and send out an alarm command to the alarm unit so as to cause the alarm unit to sound an alarm.

In some optional embodiments, the torque control system is configured to: obtain a distance between the fully open position and the fully closed position of the valve by correcting the valve twice.

In some optional embodiments, the torque control system is configured to: in a first correction of the valve, cause the driving device to drive the valve in a first direction, and obtain and store, through the control unit, a first pulse signal number that corresponds to one position within the fully open position and the fully closed position of the valve; after the first pulse signal number is obtained, in a second correction of the valve, cause the driving device to drive the valve in a second direction opposite to the first direction, and obtain and store, through the control unit, a second pulse signal number that corresponds to another position within the fully open position and the fully closed position of the valve; and cause the control unit to calculate the distance between the fully open position and the fully closed position of the valve based on the first pulse signal number and the second pulse signal number.

The present application further provides a method of controlling the torque applying on the valve during the opening and closing process of the valve through the torque control system, the method including:

detecting information related to the operation of the driving device for driving the valve and generating the corresponding driving device operation signal;

obtaining the control parameter for controlling the operating torque of the driving device based on the driving device operation signal;

generating the control command based on the obtained control parameter; and outputting the control command to the drive unit so as to change the operation parameter of the driving device, thereby adjusting the torque applying by the driving device on the valve.

In some optional embodiments, the method further includes:

causing the driving device to drive the valve with the minimum operating torque, based on the initial control command output by the control unit;

causing the detection unit to output the pulse signal in response to detection of the operation of the driving device;

causing the control unit to obtain the pulse signal number and the pulse signal time interval based on the pulse signal, and comparing the obtained pulse signal number and the obtained pulse signal time interval respectively with the predetermined pulse signal number and the predetermined pulse signal time interval pre-stored in the control unit, in order to determine whether the torque applying by the driving device on the valve is insufficient, and in case it is determined that the torque applying by the driving device on the valve is insufficient, outputting the torque increase command to the driving unit to increase the torque applying by the driving device on the valve.

In some optional embodiments, the method includes: in case the obtained pulse signal time interval is greater than the predetermined pulse signal time interval and the obtained pulse signal number is smaller than the predetermined pulse signal number, then determining that the torque applying by the driving device on the valve is insufficient.

In some optional embodiments, the method includes: in case it is determined that the torque applying by the driving device on the valve is insufficient, outputting the torque increase command from the control unit to the drive unit and changing the operation parameter of the driving device in a pulse width modulation manner, thereby gradually increasing the torque applying by the driving device on the valve until the predetermined maximum operating torque of the driving device is reached.

In some embodiments, the method includes: in case it is determined that the torque applying by the driving device on the valve is insufficient, the control unit outputs a torque increase command to the drive unit and changes the operation parameter of the driving device in a pulse width modulation manner so that the torque applying by the drive on the valve is incremented by 10% each time.

In some optional embodiments, the method further includes: detecting the operating current of the driving device by the current sensor during the opening and closing process of the valve and generating the current signal, causing the control unit to obtain the stall current of the driving device based on the current signal from the current sensor, and comparing the obtained stall current with the predetermined stall current pre-stored in the control unit, in order to determine whether the valve is in the fully open position or the fully closed position, and in case it is determined that the valve is in the fully open position or the fully closed position, outputting the torque output stop command to the drive unit so as to cause the driving device to stop applying torque to the valve.

In some optional embodiments, the method further includes: in case the obtained pulse signal time interval is greater than the predetermined pulse signal time interval, the obtained pulse signal number is greater than the predetermined pulse signal number, and the obtained stall current is greater than the predetermined stall current, determining that the valve is in the fully open position or the fully closed position, and causing the control unit to output a torque output stop command to the drive unit so as to cause the driving device to stop applying torque to the valve.

In some optional embodiments, the method includes: in case the torque applying by the driving device on the valve exceeds the predetermined maximum operating torque of the driving device, causing the control unit to output a torque output stop command to the drive unit so as to cause the driving device to stop applying torque to the valve and send out the alarm command to the alarm unit in order to cause the alarm unit to sound the alarm.

In some optional embodiments, the method includes: correcting the valve to obtain a minimum operating torque, wherein the correction of the valve to obtain the minimum operating torque includes:

during the correction of the valve, causing the driving device to drive the valve with a predetermined minimum initial torque value;

in case the torque applying by the driving device on the valve is insufficient, the control unit outputs a torque increase command to the drive unit to gradually increase the torque applying by the driving device on the valve;

in case the control unit receives the pulse signal output by the detection unit in response to detecting the operation of the driving device, the current torque applying by the driving device on the valve through the control unit is recorded; and on the basis of the current torque, 5% to 10% is increased in order to obtain the minimum operating torque.

In some optional embodiments, the method includes: correcting the valve to obtain a predetermined pulse signal number, wherein the correction of the valve to obtain the predetermined pulse signal number includes:

obtaining the predetermined pulse signal number by calculation and storing the predetermined pulse signal number in the control unit;

during the correcting process of the valve, in case the pulse signal number and the pulse signal time interval obtained by the control unit based on the pulse signal from the detection unit are respectively greater than the predetermined pulse signal number and the predetermined pulse signal time interval pre-stored in the control unit, and it is determined that the valve is in the fully open position or the fully closed position, the current pulse signal number is recorded by the control unit; and on the basis of the current pulse signal number, 5% to 10% is decreased in order to obtain the predetermined pulse signal number.

In some optional embodiments, the method includes: obtaining the distance between the fully open position and the fully closed position of the valve by correcting the valve twice.

In some optional embodiments, the method includes: in the first correction of the valve, causing the driving device to drive the valve in the first direction, and obtaining and storing, through the control unit, the first pulse signal number that corresponds to one position within the fully open position and the fully closed position of the valve;

after the first pulse signal number is obtained, in the second correction of the valve, causing the driving device to drive the valve in the second direction opposite to the first direction, and obtaining and storing, through the control unit, the second pulse signal number that corresponds to another position within the fully open position and the fully closed position of the valve; and causing the control unit to calculate the distance between the fully open position and the fully closed position of the valve based on the first pulse signal number and the second pulse signal number.

In some optional embodiments, the method includes: in the first correction of the valve, causing the control unit to determine that the valve is in the fully open position or the fully closed position in response to the following conditions, thereby outputting a torque output stop command to the drive unit in order to stop the motor from applying torque on the valve and obtain the first pulse signal number:

the operating current of the motor detected by the current sensor is greater than the first predetermined stall current;

the pulse signal number obtained by the control unit is greater than the first predetermined pulse signal number; and the pulse signal time interval obtained by the control unit is greater than the first predetermined pulse signal time interval.

In some optional embodiments, in the first correction of the valve, the initial torque value of the motor is set to 30% of the rated output torque of the motor.

In some optional embodiments, in the first correction of the valve, the motor is caused to continuously drive the valve in the first direction, in case the pulse signal number obtained by the control unit is smaller than the first predetermined pulse signal number, the pulse signal time interval obtained by the control unit is smaller than the first pulse signal time interval, and the operating current of the motor detected by the current sensor is smaller than the first predetermined stall current.

In some optional embodiments, the method includes: in the first correction of the valve, causing the motor to drive the valve in a second direction opposite to the first direction, in case the pulse signal number obtained by the control unit is smaller than the first predetermined pulse signal number, the pulse signal time interval obtained by the control unit is greater than the first pulse signal time interval, and the operating current of the motor detected by the current sensor is greater than the first predetermined stall current, and in case the driving device drives the valve in the second direction, determining that the torque applying by the driving device on the valve is insufficient when the pulse signal number obtained by the control unit is smaller than the first predetermined pulse signal number.

In some optional embodiments, the method includes: in the first correction of the valve, in case it is determined that the torque applying by the driving device on the valve is insufficient, the control unit outputs a torque increase command to the drive unit and changes the operation parameter of the driving device in a pulse width modulation manner, so that the torque applying by the driving device on the valve is increased in an increment of 10% each time until a predetermined first maximum operating torque of the driving device is reached.

In some optional embodiments, the method includes: in the first correction of the valve, in case the torque applying by the driving device on the valve is increased to greater than the first maximum operating torque, it is determined that the first correction has failed.

In some optional embodiments, it is determined that the first correction of the valve is successful in the following cases:

in the first correction of the valve, in case the pulse signal number obtained by the control unit is smaller than the first predetermined pulse signal number, and the pulse signal time interval obtained by the control unit is greater than the first predetermined pulse signal time interval, and the operating current of the driving device detected by the current sensor is greater than the first predetermined stall current, the driving device drives the valve in the second direction opposite to the first direction;

in case the driving device drives the valve in the second direction, and the pulse signal number obtained by the control unit is greater than the first predetermined pulse signal number, the driving device continues to drive the valve in the first direction, and through the torque increase command output by the control unit to the drive unit, the operation parameter of the driving device is changed in a pulse width modulation manner in order to increase the torque applying by the driving device on the valve by 20%; and after the torque applying by the driving device on the valve is increased by 20%, the pulse signal number obtained by the control unit is greater than the first predetermined pulse signal number.

In some optional embodiments, the method includes: the control unit determines in the first correction of the valve that the valve is in the fully open position or the fully closed position, thereby outputting the torque output stop command to the drive unit to cause the motor to stop applying torque on the valve, and in case the first pulse signal number is obtained, the second correction is performed on the valve.

In some optional embodiments, the method includes: in the second correction of the valve, the control unit determines that the valve is in the fully open position or the fully closed position in response to the following conditions, thereby outputting the torque output stop command to the drive unit in order to stop the driving device from applying torque on the valve and obtain the second pulse signal number:

the operating current of the motor detected by the current sensor is greater than the first predetermined stall current;

the pulse signal number obtained by the control unit is greater than the second predetermined pulse signal number; and the pulse signal time interval obtained by the control unit is greater than the first predetermined pulse signal time interval.

In some optional embodiments, the method includes: in the second correction of the valve, in case the pulse signal time interval obtained by the control unit is greater than the first predetermined pulse signal time interval, the pulse signal number obtained by the control unit is smaller than the second predetermined pulse signal number, and the operating current of the driving device detected by current sensor is greater than the first predetermined stall current, it is determined that the torque applying by the driving device on the valve is insufficient.

In some optional embodiments, the method includes: in the second correction of the valve, in case it is determined that the torque applying by the motor on the valve is insufficient, the control unit outputs a torque increase command to the drive unit to change the operation parameter of the driving device in a pulse width modulation manner, so that the torque applying by the motor on the valve is gradually increased until the predetermined second maximum operating torque of the motor is reached.

According to the torque control system and the control method thereof in the present application, the fully open and fully closed positions of the valve can be automatically determined without requiring manual operation of the valve. In addition, the control unit of the torque control system can obtain control parameters based on the operation signal of the driving device detected by the detection unit, and output the control command to the driving unit to change the operation parameter of the driving device, so that the torque applying by the driving device on the valve can be adjusted, therefore the torque required by the valve can be accurately output by the torque control system of the present application, so that there is no circumstances that the operating torque is too large to damage the valve or the operating torque is too small to be unable to drive the valve, and the efficiency of power utilization is improved.

DESCRIPTION OF THE DRAWINGS

The above and other objects, features and advantages of the present disclosure can be more easily understood with reference to the following detailed description of exemplary embodiments of the present disclosure in conjunction with the accompanying drawings. In all the drawings, the same or corresponding technical features or components will be represented by the same or corresponding reference numerals. In the drawings, the sizes and relative positions of components are not necessarily drawn to scale. In the attached drawings.

DETAILED DESCRIPTION

Figure 1:
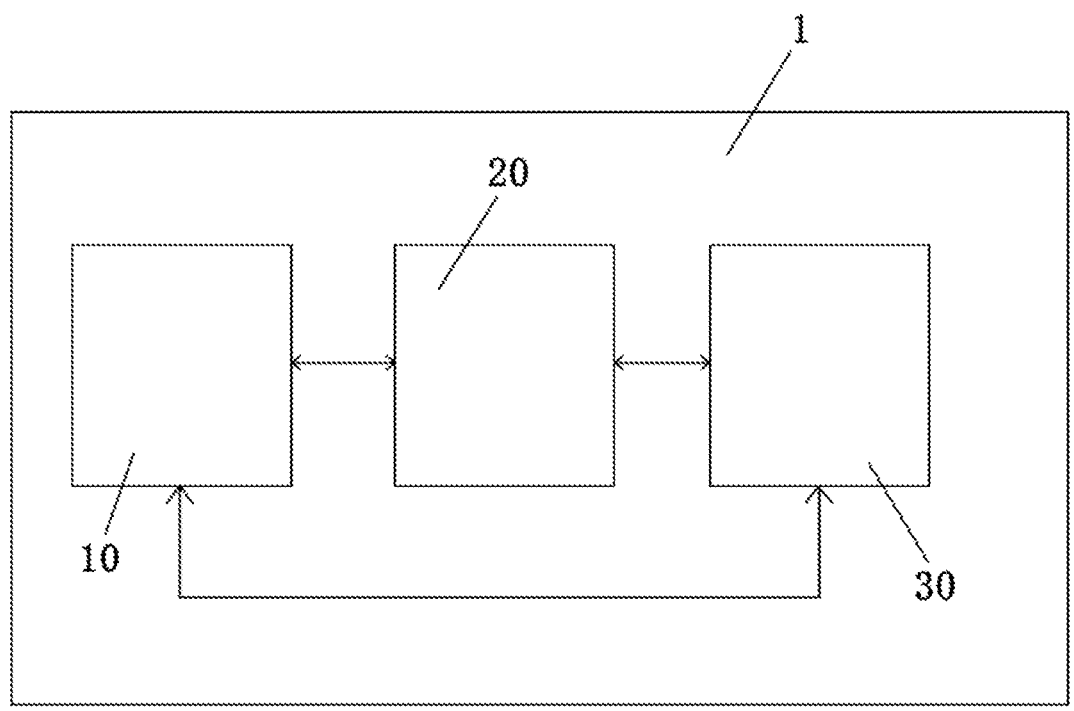
FIG. 1 shows a schematic block diagram of a torque control system according to an exemplary embodiment of the present disclosure.

The present disclosure will be described in detail below by means of exemplary embodiments with reference to the accompanying drawings. It is to be noted that the exemplary embodiments of the present disclosure are intended to enable those of ordinary skill in the art to easily implement the present disclosure, and that various embodiments of the present disclosure may be implemented in many different forms and should not be construed as limited to the embodiments set forth in the present disclosure. Accordingly, the following detailed description of the present disclosure is for purposes of illustration only, and not limitation of the present disclosure in any way. In addition, the same reference numerals are used to refer to the same components in the various figures.

It should also be noted that, for the sake of clarity, not all features of an actual specific implementation are described and illustrated in the specification and drawings, and to avoid obscuring the technical solutions of the present disclosure with unnecessary details, in the drawings and the specification, only structures of the devices closely related to the technical solutions of the present disclosure are described and shown, while other details that are not related to the technical content of the present disclosure and known to those skilled in the art are omitted.

Figure 2:
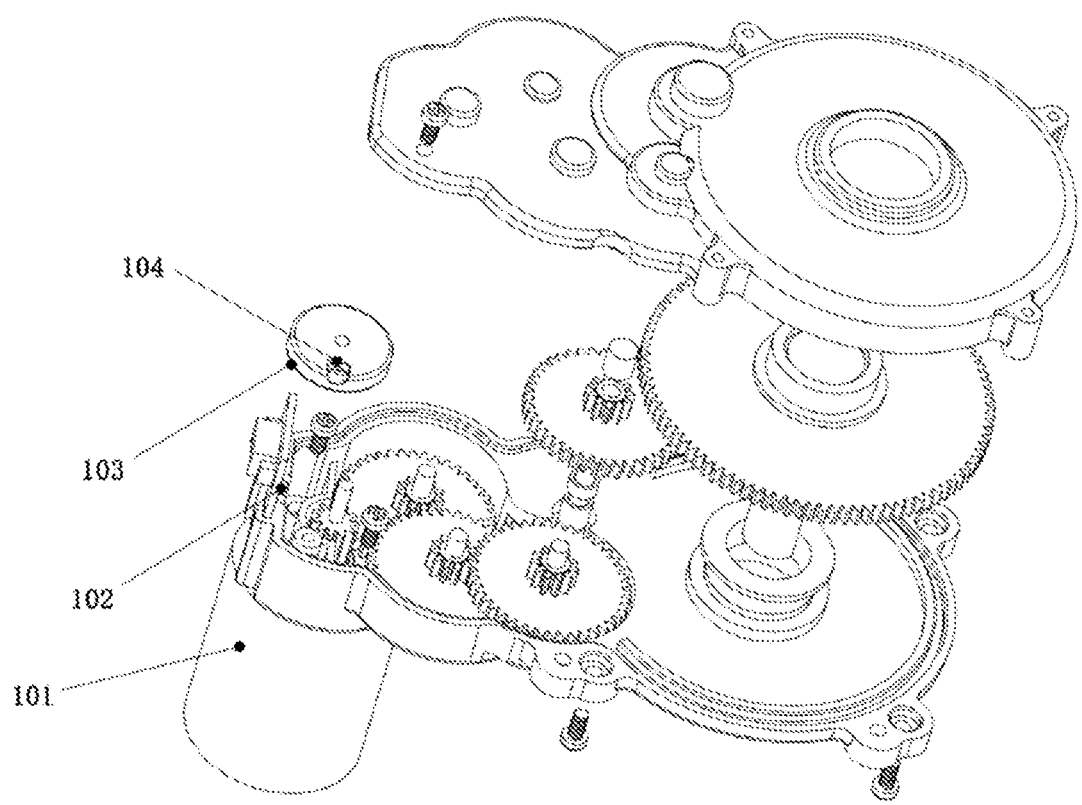
FIG. 2 shows a perspective view of a driving device according to an exemplary embodiment of the present disclosure.

Next, the torque control system according to an exemplary embodiment of the present application will be described in detail with reference to FIGS. 1 and 2. FIG. 1 shows a schematic block diagram of a torque control system according to an exemplary embodiment of the present disclosure, and FIG. 2 shows a perspective view of a driving device according to an exemplary embodiment of the present disclosure.

As shown in FIG. 1, as an exemplary embodiment of the present application, the torque control system 1 is used for controlling a torque applying on a valve during an opening and closing process of the valve, the torque control system 1 includes: a drive unit 10, the drive unit 10 including a driving device, the driving device operatively connected to the valve to drive the valve between a fully open position and a fully closed position of the valve; a detection unit 20, the detection unit 20 being used for detecting information related to operation of the driving device and generating a corresponding driving device operation signal; and a control unit 30, the control unit 30 being configured to: receive the driving device operation signal from the detection unit 20; obtain a control parameter for controlling an operating torque of the driving device based on the driving device operation signal; generate a control command based on the obtained control parameter; and output the control command to the drive unit so as to change an operation parameter of the driving device, thereby adjusting the torque applying by the driving device to the valve.

In an exemplary embodiment of the present application, the torque control system 1 is configured to: cause the driving device to drive the valve with a predetermined minimum operating torque, based on an initial control command output by the control unit 30; cause the detection unit 20 to generate the driving device operation signal in response to the operation of the driving device, the driving device operation signal including a pulse signal; cause the control unit to obtain a pulse signal number and a pulse signal time interval based on the pulse signal, and compare the obtained pulse signal number and the obtained pulse signal time interval respectively with a predetermined pulse signal number and a predetermined pulse signal time interval pre-stored in the control unit, so as to determine whether the torque applying by the driving device on the valve is insufficient, and in case it is determined that the torque applying by the driving device on the valve is insufficient, cause the control unit 30 to output a torque increase command to the drive unit 10 in order to increase the torque applying by the driving device on the valve.

In the context of this application, insufficient torque applying on the valve means that the operating torque currently applying on the valve is insufficient to drive the valve.

In an exemplary embodiment of the present application, the torque control system 1 is configured to: determine that the torque applying by the driving device on the valve is insufficient, in case the obtained pulse signal time interval is greater than the predetermined pulse signal time interval and the obtained pulse signal number is smaller than the predetermined pulse signal number.

In some embodiments, during normal operation of a motor, the pulse signal time interval obtained by the control unit will be below 100 ms, and the pulse signal time interval will gradually increase to 100-200 ms or more as the advancing distance decreases or cannot be advanced, when the pulse signal time interval exceeds 200 ms, it will be determined that the valve has reached the end point and will stop advancing immediately.

In an exemplary embodiment of the present application, the torque control system 1 is so configured that: in case it is determined that the torque applying by the driving device on the valve is insufficient, the control unit outputs the torque increase command to the drive unit 10 and changes the operation parameter of the driving device in a pulse width modulation manner, thereby causing the torque applying by the driving device on the valve to gradually increase until a predetermined maximum operating torque of the driving device is reached.

In some embodiments, the control unit can change the operation parameter of the driving device in a voltage feedback regulation manner or a current feedback regulation manner, thereby causing the torque applying by the driving device on the valve to gradually increase until a predetermined maximum operating torque of the driving device is reached.

In some embodiments, the predetermined maximum operating torque of the driving device is 80% of the rated output torque of an electric motor.

In an exemplary embodiment of the present application, the torque increase command output by the control unit to the drive unit 10 changes the operation parameter of the driving device in a pulse width modulation manner so that the torque applying by the driving device on the valve is incremented by 10% each time. It should be understood that each time a torque increase command is received, the torque applying by the driving device on the valve may be incremented in other ways depending on specific circumstances.

In an exemplary embodiment of the present application, the detection unit 20 may include a pulse detector, the pulse detector may include, for example, Hall sensor 102. The Hall sensor 102 is mounted in association with an output shaft of the driving device 101 in the drive unit, or in association with a transmission portion or a speed changing portion of a transmission system in the drive unit, and generates the pulse signal in response to the operation of the driving device 101, the detection unit 20 further includes a current sensor, the current sensor is installed on the driving device and configured to detect an operating current of the driving device and generate a current signal during the opening and closing process of the valve.

In some embodiments, the driving device 101 includes an electric motor (or motor). As shown in FIG. 2, in the initial non-working state, the Hall sensor 102 is installed to be relatively stationary with the motor housing, when the motor rotates, the output shaft of the motor drives a pinion 103 installed with a magnet 104 to rotate, the magnet 104 on the pinion 103 rotates relative to the Hall sensor 102 one time, it causes the Hall sensor 102 to trigger one pulse signal, the control unit obtains the pulse signal number and the pulse signal time interval based on the pulse signal, thereafter the obtained pulse signal number and the obtained pulse signal time interval are respectively compared with the predetermined pulse signal number and the predetermined pulse signal time interval pre-stored in the control unit, so as to determine whether the torque applying by the driving device on the valve is insufficient, and in case it is determined that the torque applying by the driving device on the valve is insufficient, the control unit 30 outputs a torque increase command to the drive unit 10 in order to increase the torque applying by the driving device 101 on the valve. By using Hall components to detect the pulse signal generated by rotation of the motor, the control accuracy of the control unit is improved.

In some embodiments, the control unit may include a micro control unit (MCU) and/or a chip.

In other embodiments, the pulse detector may include a photoelectric coupler device, the photoelectric coupler device may include a light-emitting component and a light sensor, the motor is provided with a pinion, the pinion is provided with a small hole, the light-emitting component is installed on one side of the pinion, the light sensor is installed on the other side of the pinion. When the motor rotates, the output shaft or transmission shaft of the motor drives the pinion provided with the small hole to rotate, the small hole on the pinion allows light emitted by the light-emitting component to pass through intermittently, each time the light passes through the small hole on the pinion, the light sensor triggers a pulse signal, the control unit obtains the pulse signal number and pulse signal time interval based on the pulse signal, and then compares the obtained pulse signal number and the obtained pulse signal time interval respectively with the predetermined pulse signal number and the predetermined pulse signal time interval pre-stored in the control unit, so as to determine whether the torque applying by the driving device on the valve is insufficient, and in case it is determined that the torque applying by the driving device to the valve is insufficient, the control unit 30 outputs the torque increase command to the drive unit 10 to increase the torque applying by the driving device 101 on the valve.

In an exemplary embodiment of the present application, the torque control system is configured to: cause the control unit to obtain a stall current of the driving device based on the current signal from the current sensor, and compare the obtained stall current with a predetermined stall current pre-stored in the control unit, in order to determine whether the valve is in the fully open position or the fully closed position, and in case it is determined that the valve is in the fully open position or the fully closed position, output a torque output stop command to the drive unit 10 in order to cause the driving device 101 to stop applying torque to the valve.

It should be understood that stall-rotor is a situation in which the motor still outputs a torque when the rotating speed is zero, when the valve reaches the fully open position or the fully closed position during opening and closing, excessive load on the motor may cause the rotation of the motor to stop, in which case stall-rotor occurs, and the stall current is sensed by the current sensor.

In some embodiments, the torque control system is configured to: determine that the valve is in the fully open position or the fully closed position, cause the control unit to output the torque output stop command to the drive unit 10, such that the driving device 101 stops applying torque to the valve, in case the obtained pulse signal time interval is greater than the predetermined pulse signal time interval, the obtained pulse signal number is greater than the predetermined pulse signal number, and the obtained stall current is greater than the predetermined stall current.

In some embodiments, the torque control system further includes an alarm unit, the torque control system is configured to: in case that the torque applying by the driving device on the valve exceeds the predetermined maximum operating torque of the driving device, cause the control unit to output the torque output stop command to the drive unit 10 in order to cause the driving device to stop applying torque to the valve, and send out an alarm command to the alarm unit so as to cause the alarm unit to sound an alarm.

In some embodiments, the torque control system is configured to: obtain a distance between the fully open position and the fully closed position of the valve (or between a starting point and an end point) by correcting the valve twice.

In some embodiments, the torque control system is configured to:

in a first correction of the valve, cause the driving device to drive the valve in a first direction, and obtain and store, through the control unit, a first pulse signal number that corresponds to one position within the fully open position and the fully closed position of the valve;

after the first pulse signal number is obtained, in a second correction of the valve, cause the driving device to drive the valve in a second direction opposite to the first direction, and obtain and store, through the control unit, a second pulse signal number that corresponds to another position within the fully open position and the fully closed position of the valve; and cause the control unit to calculate the distance between the fully open position and the fully closed position of the valve based on the first pulse signal number and the second pulse signal number.

In the embodiment of the present application, based on the driving device operation signal detected by the detection unit in real time, the control unit adjusts the torque applying by the driving device on the valve, so that the torque control system of the present application can accurately output a torque required by the valve, protect the valve from damage, increase the service life of the valve, and at the same time improve the efficiency of power utilization. In addition, the fully open position and the fully closed position of the valve can be automatically determined without the need of manual operation the valve, so that the rotation path of the valve during the opening and closing process can be accurately determined.

Next, a method for controlling the torque applying on the valve by the torque control system will be described, and the method includes:

detecting information related to the operation of the driving device for driving the valve and generating the corresponding driving device operation signal;

obtaining the control parameter for controlling the operating torque of the driving device based on the driving device operation signal;

generating the control command based on the obtained control parameter; and outputting the control command to the drive unit so as to change the operation parameter of the driving device, thereby adjusting the torque applying by the driving device on the valve.

In some embodiments, the method further includes: causing the driving device to drive the valve with the minimum operating torque, based on the initial control command output by the control unit; causing the detection unit to output the pulse signal in response to detection of the operation of the driving device; causing the control unit to obtain the pulse signal number and the pulse signal time interval based on the pulse signal, and comparing the obtained pulse signal number and the obtained pulse signal time interval respectively with the predetermined pulse signal number and the predetermined pulse signal time interval pre-stored in the control unit, in order to determine whether the torque applying by the driving device on the valve is insufficient, and in case it is determined that the torque applying by the driving device on the valve is insufficient, outputting the torque increase command to the driving unit to increase the torque applying by the driving device on the valve.

In some embodiments, the method further includes: in case the obtained pulse signal time interval is greater than the predetermined pulse signal time interval and the obtained pulse signal number is smaller than the predetermined pulse signal number, then determining that the torque applying by the driving device on the valve is insufficient.

In some embodiments, the method includes: in case it is determined that the torque applying by the driving device on the valve is insufficient, outputting the torque increase command from the control unit to the drive unit and changing the operation parameter of the driving device in a pulse width modulation manner, thereby gradually increasing the torque applying by the driving device on the valve until the predetermined maximum operating torque of the driving device is reached.

In some embodiments, the method includes: in case it is determined that the torque applying by the driving device on the valve is insufficient, the control unit outputs a torque increase command to the drive unit and changes the operation parameter of the driving device in a pulse width modulation manner so that the torque applying by the drive on the valve is incremented by 10% each time.

In some embodiments, the method further includes: detecting the operating current of the driving device by the current sensor during the opening and closing process of the valve and generating the current signal, causing the control unit to obtain the stall current of the driving device based on the current signal from the current sensor, and comparing the obtained stall current with the predetermined stall current pre-stored in the control unit, in order to determine whether the valve is in the fully open position or the fully closed position, and in case it is determined that the valve is in the fully open position or the fully closed position, outputting the torque output stop command to the drive unit so as to cause the driving device to stop applying torque to the valve.

In some embodiments, the method further includes: in case the obtained pulse signal time interval is greater than the predetermined pulse signal time interval, the obtained pulse signal number is greater than the predetermined pulse signal number, and the obtained stall current is greater than the predetermined stall current, determining that the valve is in the fully open position or the fully closed position, and causing the control unit to output a torque output stop command to the drive unit so as to cause the driving device to stop applying torque to the valve.

In some embodiments, the method further includes: in case the torque applying by the driving device on the valve exceeds the predetermined maximum operating torque of the driving device, causing the control unit to output a torque output stop command to the drive unit so as to cause the driving device to stop applying torque to the valve and send out the alarm command to the alarm unit in order to cause the alarm unit to sound the alarm.

In some embodiments, the method includes: correcting the valve to obtain a minimum operating torque, wherein the correction of the valve to obtain the minimum operating torque includes: during the correction of the valve, causing the driving device to drive the valve with a predetermined minimum initial torque value; in case the torque applying by the driving device on the valve is insufficient, the control unit outputs a torque increase command to the drive unit to gradually increase the torque applying by the driving device on the valve; in case the control unit receives the pulse signal output by the detection unit in response to detecting the operation of the driving device, the current torque applying by the driving device on the valve through the control unit is recorded; and on the basis of the current torque, it is increased by 5% to 10% to obtain the minimum operating torque.

Through the above steps, the valve is corrected to obtain the minimum operating torque, since the torque value recorded by the control unit is increased by 5% to 10%, the obtained minimum operating torque can be suitable for the situation that the valve is rusted.

In some embodiments, the method includes: correcting the valve to obtain a predetermined pulse signal number, wherein, correcting of the valve to obtain the predetermined pulse signal number includes: obtaining the predetermined pulse signal number by calculation and storing the predetermined pulse signal number in the control unit; during the correcting process of the valve, in case the pulse signal number and the pulse signal time interval obtained by the control unit based on the pulse signal from the detection unit are respectively greater than the predetermined pulse signal number and the predetermined pulse signal time interval pre-stored in the control unit, and it is determined that the valve is in the fully open position or the fully closed position, the current pulse signal number is recorded by the control unit; and the current pulse signal number is decreased by 5% to 10%, in order to obtain the predetermined pulse signal number.

Through the above steps, the valve is corrected to obtain the predetermined pulse signal number, and the obtained pulse signal number can be the pulse signal number required for the actual opening and closing of the valve, since the pulse signal number recorded by the control unit is decreased by 5% to 10%, this can prevent the valve from being damaged due to excessive turning of the valve handle.

Next, a method for obtaining the distance between the fully open position and the fully closed position of the valve will be described with reference to FIG. 3 and FIG. 4, the method includes: obtaining the distance between the fully open position and the fully closed position of the valve by correcting the valve twice.

Figure 3:
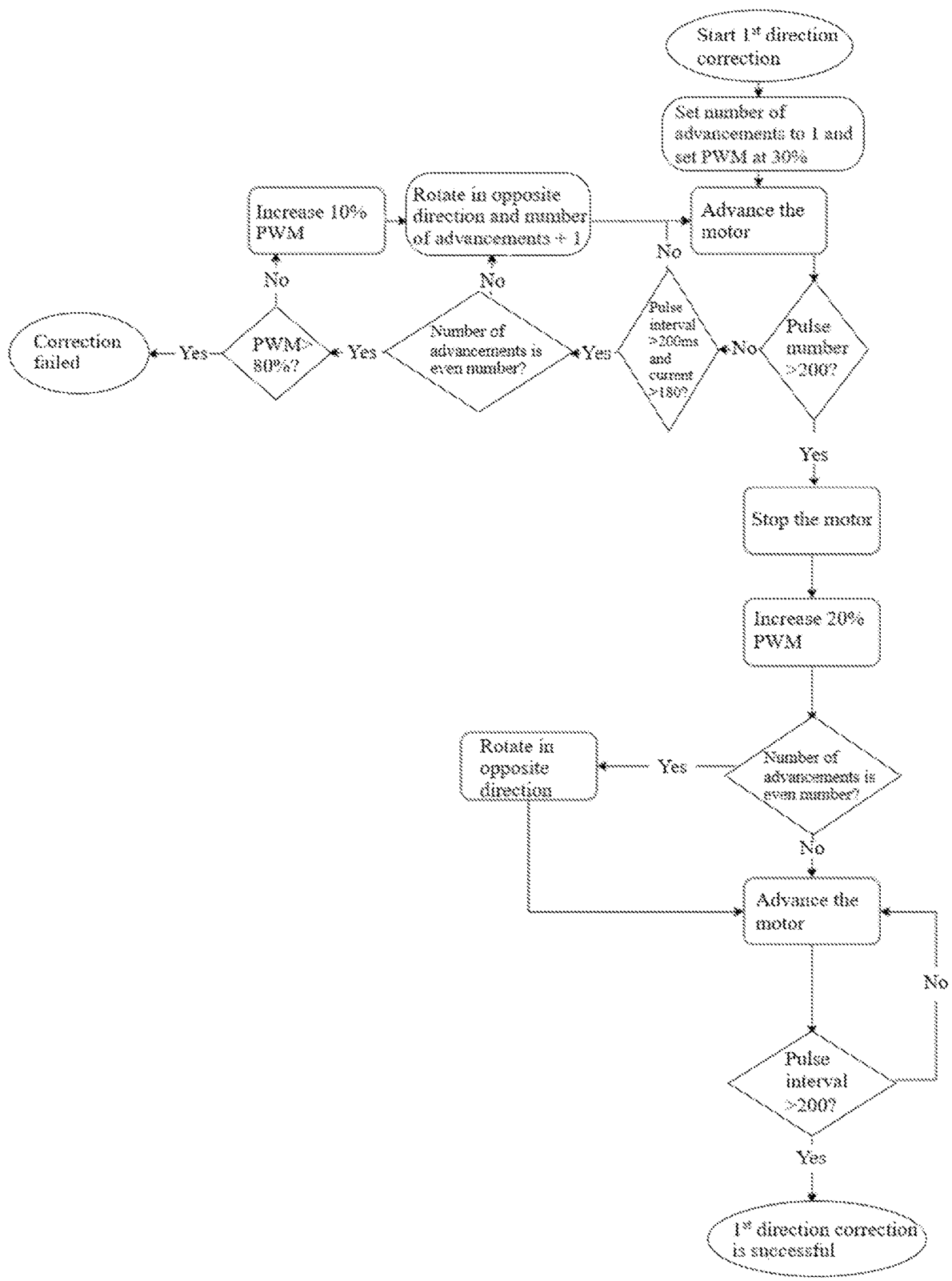
FIG. 3 shows a schematic operation flowchart of a first correction in the process of determining the distance between a fully open position and a fully closed position of a valve according to an exemplary embodiment of the present disclosure.
Figure 4:
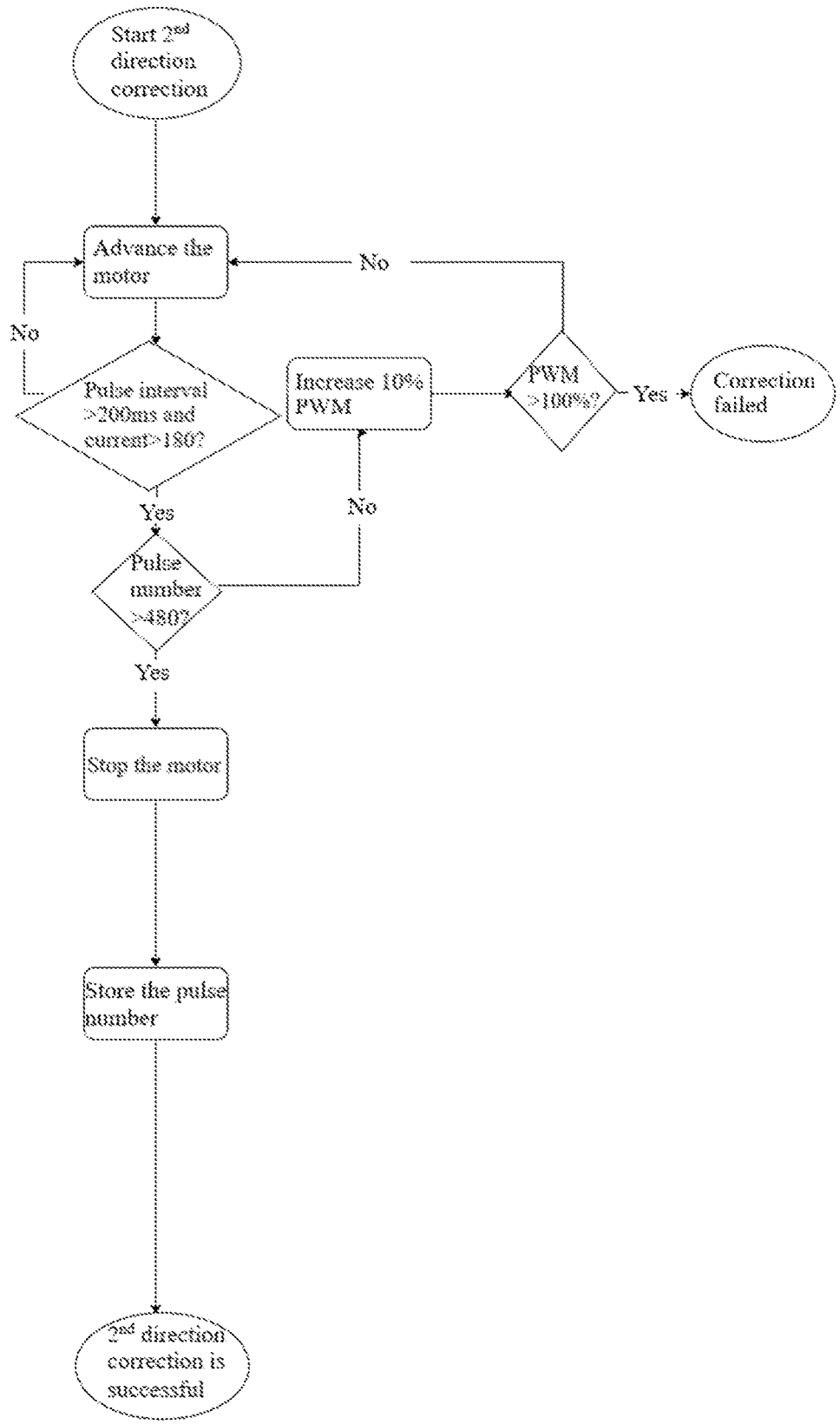
FIG. 4 shows a schematic operation flowchart of a second correction in the process of determining the distance between a fully open position and a fully closed position of a valve according to an exemplary embodiment of the present disclosure.

In some embodiments, in the first correction of the valve (as shown in FIG. 3), causing the driving device to drive the valve in the first direction, and obtaining and storing, through the control unit, the first pulse signal number that corresponds to one position within the fully open position and the fully closed position of the valve; after the first pulse signal number is obtained, in the second correction of the valve (as shown in FIG. 4), causing the driving device to drive the valve in the second direction opposite to the first direction, and obtaining and storing, through the control unit, the second pulse signal number that corresponds to another position within the fully open position and the fully closed position of the valve; and causing the control unit to calculate the distance between the fully open position and the fully closed position of the valve based on the first pulse signal number and the second pulse signal number.

In some embodiments, the method includes: in the first correction of the valve, causing the control unit to determine that the valve is in the fully open position or the fully closed position in response to the following conditions, thereby outputting a torque output stop command to the drive unit in order to stop the motor from applying torque on the valve and obtain the first pulse signal number:

the operating current of the motor detected by the current sensor is greater than the first predetermined stall current;

the pulse signal number obtained by the control unit is greater than the first predetermined pulse signal number; and the pulse signal time interval obtained by the control unit is greater than the first predetermined pulse signal time interval.

In some embodiments, the first predetermined stall current is 180 mA. It should be understood that the first predetermined stall current of 180 mA is only an example, the first predetermined stall current may be of any value according to the specific structure and type of the valve. In some embodiments, the motor is tested in advance to determine the maximum value of the stall current when locking of rotor occurs and the average value of the current during normal operation, and determine the predetermined stall current based on the maximum value of the stall current and the average value of the current during normal operation.

In some embodiments, the first predetermined pulse signal number is 200, and the first pulse signal time interval is 200 ms. It should be understood that the predetermined pulse signal number of 200 and the pulse signal time interval of 200 ms are only examples, and the predetermined pulse signal number and pulse signal time interval can be set to any values according to the specific mechanical design of the valve and the magnitude of rotation of the valve.

In some embodiments, the method includes: in the first correction of the valve, the initial torque value of the motor is set to 30% of the rated output torque of the motor. In addition, the number of advancements of the motor is set to 1.

In some embodiments, in the first correction of the valve, the first predetermined stall current is set to 180 mA, the first predetermined pulse signal number is set to 200, and the first pulse signal time interval is set to 200 ms. The method includes: in the first correction of the valve, causing the motor to continuously drive the valve in the first direction, in case the pulse signal number obtained by the control unit is smaller than 200, the pulse signal time interval obtained by the control unit is smaller than 200 ms, and the operating current of the motor detected by the current sensor is smaller than 180 mA.

In some embodiments, the method includes: in the first correction of the valve, causing the motor to drive the valve in a second direction opposite to the first direction, in case the pulse signal number obtained by the control unit is smaller than 200, the pulse signal time interval obtained by the control unit is greater than 200 ms, and the operating current of the motor detected by the current sensor is greater than 180 mA, and in case the motor drives the valve in the second direction, determining that the torque applying by the motor on the valve is insufficient when the pulse signal number obtained by the control unit is smaller than 200.

In the first correction of the valve, in case it is determined that the torque applying by the motor on the valve is insufficient, the control unit outputs a torque increase command to the drive unit and changes the operation parameter of the motor in a pulse width modulation manner, so that the torque applying by the motor on the valve is increased in an increment of 10% each time until a predetermined first maximum operating torque of the motor is reached.

In some embodiments, the initial torque value of the motor is set to 30N·m. In some embodiments, the predetermined first maximum operating torque is 80% of the rated output torque of the motor. In some embodiments, the first maximum operating torque is 80N·m. It should be understood that 80N·m is only an example, and the first maximum operating torque can be set to any value according to the actual structure of the valve.

In the first correction of the valve, in case the torque applying by the motor on the valve is increased to greater than 80N·m, it is determined that the first correction has failed.

In some embodiments, it is determined that the first correction of the valve is successful in the following cases: in the first correction of the valve, in case the pulse signal number obtained by the control unit is smaller than 200, and the pulse signal time interval obtained by the control unit is greater than 200 ms, and the operating current of the motor detected by the current sensor is greater than 180 mA, the motor drives the valve in the second direction opposite to the first direction; in case the motor drives the valve in the second direction, and the pulse signal number obtained by the control unit is greater than the first predetermined pulse signal number, the motor continues to drive the valve in the first direction, and through the torque increase command output by the control unit to the drive unit, the operation parameter of the motor is changed in a pulse width modulation manner in order to increase the torque applying by the motor on the valve; and the torque applying by the motor on the valve is increased until the pulse signal number obtained by the control unit is greater than 200. In other words, in some embodiments, if the motor is driven in the first direction, after the obtained pulse signal number is smaller than 200, the motor is driven in the second direction opposite to the first direction, and if the pulse signal number obtained when driving in the second direction is greater than 200, then it is determined that it can be advanced, the control unit will determine that the direction of the previous correction is close to/has reached the starting point (fully open/fully closed position), and immediately stops the current action, so that the motor advances continuously along the previous first direction, and at the same time 20% is added on the basis of the current torque value to prevent the valve from rusting in the future until the condition of stopping of the advancement is reached.

In some embodiments, the control unit determines in the first correction of the valve that the valve is in the fully open position or the fully closed position, thereby outputting the torque output stop command to the drive unit to cause the motor to stop applying torque on the valve, and in case the first pulse signal number is obtained, the second correction is performed on the valve. In some embodiments, after the first correction is successful, the control unit will determine the current position as the starting point of the valve, and record the pulse signal number collected when the first correction is successful, when a user performs the second correction, the same method is used to push the valve to the end point, and the pulse signal number collected is recorded to obtain the distance between the starting point and the end point, i.e., to calculate the distance between the fully open position and the fully closed position of the valve.

In the second correction of the valve, the predetermined stall current is set to 180 mA, the second predetermined pulse signal number is set to 480, and the pulse signal time interval is set to 200 ms. The control unit determines that the valve is in the fully open position or the fully closed position in response to the following conditions, thereby outputting the torque output stop command to the drive unit in order to stop the motor from applying torque on the valve and obtain the second pulse signal number: the operating current of the motor detected by the current sensor is greater than 180 mA; the pulse signal number obtained by the control unit is greater than 480; and the pulse signal time interval obtained by the control unit is greater than 200 ms.

In some embodiments, in the second correction of the valve, in case the pulse signal time interval obtained by the control unit is greater than 200 ms, the pulse signal number obtained by the control unit is smaller than 480, and the operating current of the motor detected by current sensor is greater than 180 mA, it is determined that the torque applying by the motor on the valve is insufficient.

In some embodiments, in the second correction of the valve, in case it is determined that the torque applying by the motor on the valve is insufficient, the control unit outputs a torque increase command to the drive unit to change the operation parameter of the motor in a pulse width modulation manner, so that the torque applying by the motor on the valve is gradually increased until the predetermined second maximum operating torque of the motor is reached. It should be understood that, the control unit may also change the operation parameter of the motor in a voltage feedback regulation manner or a current feedback regulation manner, such as changing the operating torque of the motor.

In some embodiments, the second maximum operating torque is 100% of the rated output torque of the motor. In some embodiments, the second maximum operating torque is 100N·m. It should be understood that 100N·m is only an example, and the second maximum operating torque can be set to any value according to actual design requirements.

The present disclosure has been described above through the description of the embodiments with reference to the accompanying drawings, but the present disclosure is not limited to the above-described embodiments. Those skilled in the art can understand that modifications and variations can be made without departing from the technical idea of the present disclosure, and these modifications and variations are also included in the scope of protection of the present disclosure.

INDUSTRIAL APPLICABILITY

The present disclosure provides a torque control system and a control method thereof. The torque control system is configured to automatically determine the fully open and fully closed positions of the valve without requiring manual operation of the valve. In addition, the control unit of the torque control system can obtain control parameters based on the operation signal of the driving device detected by the detection unit, and output the control command to the driving unit to change the operation parameter of the driving device, so that the torque applying by the driving device on the valve can be adjusted, therefore the torque required by the valve can be accurately output by the torque control system of the present application, so that there is no circumstances that the operating torque is too large to damage the valve or the operating torque is too small to be unable to drive the valve, and the efficiency of power utilization is improved.

Furthermore, it is appreciated that the detection unit, the control unit, the torque control system, etc. of the present disclosure can be reproduced and can be applied in a variety of industrial applications. For example, the torque control system of the present disclosure may be applied to a method of controlling the torque applying on a valve during opening and closing of the valve.

What is claimed is:

1. A torque control system, the torque control system being used for controlling a torque applying on a valve during an opening and closing process of the valve, the torque control system comprising:
   a drive unit, the drive unit comprising a driving device, the driving device operatively connected with the valve to drive the valve between a fully open position and a fully closed position of the valve;
   a detection unit, the detection unit being used for detecting information related to operation of the driving device and generating a corresponding driving device operation signal; and
   a control unit, the control unit being configured to: receive the driving device operation signal from the detection unit; obtain a control parameter for controlling an operating torque of the driving device based on the driving device operation signal; generate a control command based on the obtained control parameter; and output the control command to the drive unit so as to change an operation parameter of the driving device, thereby adjusting the torque applying by the driving device on the valve;
   wherein the torque control system is configured to:
   cause the driving device to drive the valve with a predetermined minimum operating torque, based on an initial control command output by the control unit;
   cause the detection unit to generate the driving device operation signal in response to the operation of the driving device, the driving device operation signal including a pulse signal;
   cause the control unit to obtain a pulse signal number and a pulse signal time interval based on the pulse signal, and compare the obtained pulse signal number and the obtained pulse signal time interval respectively with a predetermined pulse signal number and a predetermined pulse signal time interval pre-stored in the control unit, so as to determine whether the torque applying by the driving device on the valve is insufficient; and
   in case it is determined that the torque applying by the driving device on the valve is insufficient, cause the control unit to output a torque increase command to the drive unit in order to increase the torque applying by the driving device on the valve.

2. The torque control system according to claim 1, wherein the control unit is configured to change the operation parameter of the driving device in a voltage feedback regulation manner or a current feedback regulation manner, thereby adjusting the torque applying by the driving device on the valve.

3. The torque control system according to claim 1, wherein the torque control system is configured to: determine that the torque applying by the driving device on the valve is insufficient, in case the obtained pulse signal time interval is greater than the predetermined pulse signal time interval and the obtained pulse signal number is smaller than the predetermined pulse signal number.

4. The torque control system according to claim 3, wherein the torque control system is configured such that: in case it is determined that the torque applying by the driving device on the valve is insufficient, the control unit outputs the torque increase command to the drive unit and changes the operation parameter of the driving device in a pulse width modulation manner, thereby causing the torque applying by the driving device on the valve to gradually increase until a predetermined maximum operating torque of the driving device is reached.

5. The torque control system according to claim 4, wherein the detection unit comprises a pulse detector, the pulse detector is mounted in association with the drive unit and generates the pulse signal in response to the operation of the driving device, and the detection unit further comprises a current sensor, the current sensor is installed on the driving device and configured to detect an operating current of the driving device and generate a current signal during the opening and closing process of the valve,
   wherein the torque control system is configured to: cause the control unit to obtain a stall current of the driving device based on the current signal from the current sensor, and compare the obtained stall current with a predetermined stall current pre-stored in the control unit, in order to determine whether the valve is in the fully open position or the fully closed position, and in case it is determined that the valve is in the fully open position or the fully closed position, output a torque output stop command to the drive unit in order to cause the driving device to stop applying the torque on the valve.

6. The torque control system according to claim 5, wherein the torque control system is configured to: determine that the valve is in the fully open position or the fully closed position, cause the control unit to output the torque output stop command to the drive unit, such that the driving device stops applying the torque to the valve, in case the obtained pulse signal time interval is greater than the predetermined pulse signal time interval, the obtained pulse signal number is greater than the predetermined pulse signal number, and the obtained stall current is greater than the predetermined stall current.

7. The torque control system according to claim 6, wherein the torque control system further comprises an alarm unit, and the torque control system is configured to: cause the control unit to output the torque output stop command to the drive unit in order to cause the driving device to stop applying the torque to the valve, and send out an alarm command to the alarm unit so as to cause the alarm unit to sound an alarm, in case that the torque applying by the driving device on the valve exceeds the predetermined maximum operating torque of the driving device.

8. The torque control system according to claim 7, wherein the torque control system is configured to: obtain a distance between the fully open position and the fully closed position of the valve by correcting the valve twice.

9. The torque control system according to claim 8, wherein the torque control system is configured to:
in a first correction of the valve, cause the driving device to drive the valve in a first direction, and obtain and store, through the control unit, a first pulse signal number that corresponds to one position within the fully open position and the fully closed position of the valve;
after the first pulse signal number is obtained, in a second correction of the valve, cause the driving device to drive the valve in a second direction opposite to the first direction, and obtain and store, through the control unit, a second pulse signal number that corresponds to another position within the fully open position and the fully closed position of the valve; and
cause the control unit to calculate the distance between the fully open position and the fully closed position of the valve based on the first pulse signal number and the second pulse signal number.

10. A method of controlling a torque applying on a valve during an opening and closing process of the valve by the torque control system according to claim 9, the method comprising:
detecting information related to the operation of the driving device for driving the valve and generating the corresponding driving device operation signal;
obtaining the control parameter for controlling the operating torque of the driving device based on the driving device operation signal;
generating the control command based on the obtained control parameter; and outputting the control command to the drive unit so as to change the operation parameter of the driving device, thereby adjusting the torque applying by the driving device on the valve.

11. The method according to claim 10, wherein the method further comprises:
causing the driving device to drive the valve with the minimum operating torque, based on the initial control command output by the control unit;
causing the detection unit to output the pulse signal in response to detection of the operation of the driving device;
causing the control unit to obtain the pulse signal number and the pulse signal time interval based on the pulse signal, and comparing the obtained pulse signal number and the obtained pulse signal time interval respectively with the predetermined pulse signal number and the predetermined pulse signal time interval pre-stored in the control unit, in order to determine whether the torque applying by the driving device on the valve is insufficient, and in case it is determined that the torque applying by the driving device on the valve is insufficient, outputting the torque increase command to the driving unit to increase the torque applying by the driving device on the valve.

12. The method according to claim 11, wherein the method comprises: in case the obtained pulse signal time interval is greater than the predetermined pulse signal time interval and the obtained pulse signal number is smaller than the predetermined pulse signal number, then determining that the torque applying by the driving device on the valve is insufficient.

13. The method according to claim 12, wherein the method comprises: in case it is determined that the torque applying by the driving device on the valve is insufficient, outputting the torque increase command from the control unit to the drive unit and changing the operation parameter of the driving device in a pulse width modulation manner, thereby gradually increasing the torque applying by the driving device on the valve until the predetermined maximum operating torque of the driving device is reached.

14. The method according to claim 12, wherein the method comprises: in case the torque applying by the driving device on the valve exceeds the predetermined maximum operating torque of the driving device, causing the control unit to output the torque output stop command to the drive unit so as to cause the driving device to stop applying the torque to the valve, and send out the alarm command to the alarm unit in order to cause the alarm unit to sound the alarm.

15. The method according to claim 10, wherein the method further comprises:
detecting the operating current of the driving device by the current sensor during the opening and closing process of the valve and generating the current signal;
causing the control unit to obtain the stall current of the driving device based on the current signal from the current sensor, and comparing the obtained stall current with the predetermined stall current pre-stored in the control unit, in order to determine whether the valve is in the fully open position or the fully closed position; and
in case it is determined that the valve is in the fully open position or the fully closed position, outputting the torque output stop command to the drive unit so as to cause the driving device to stop applying the torque to the valve.

16. The method according to claim 15, wherein the method further comprises: determining that the valve is in the fully open position or the fully closed position, and causing the control unit to output the torque output stop command to the drive unit so as to cause the driving device to stop applying the torque to the valve, in case the obtained pulse signal time interval is greater than the predetermined pulse signal time interval, the obtained pulse signal number is greater than the predetermined pulse signal number, and the obtained stall current is greater than the predetermined stall current.

17. The method according to claim 15, wherein the method comprises: obtaining the distance between the fully open position and the fully closed position of the valve by correcting the valve twice.

18. The method according to claim 17, wherein the method comprises:

in the first correction of the valve, causing the driving device to drive the valve in the first direction, and obtaining and storing, through the control unit, the first pulse signal number that corresponds to one position within the fully open position and the fully closed position of the valve;

after the first pulse signal number is obtained, and in the second correction of the valve, causing the driving device to drive the valve in the second direction opposite to the first direction, and obtaining and storing, through the control unit, the second pulse signal number that corresponds to another position within the fully open position and the fully closed position of the valve; and causing the control unit to calculate the distance between the fully open position and the fully closed position of the valve based on the first pulse signal number and the second pulse signal number.

* * * * *